June 7, 1960 — G. O. HOFFSTETTER — 2,939,592
BULK FEED BODY
Filed Aug. 25, 1958 — 5 Sheets-Sheet 1
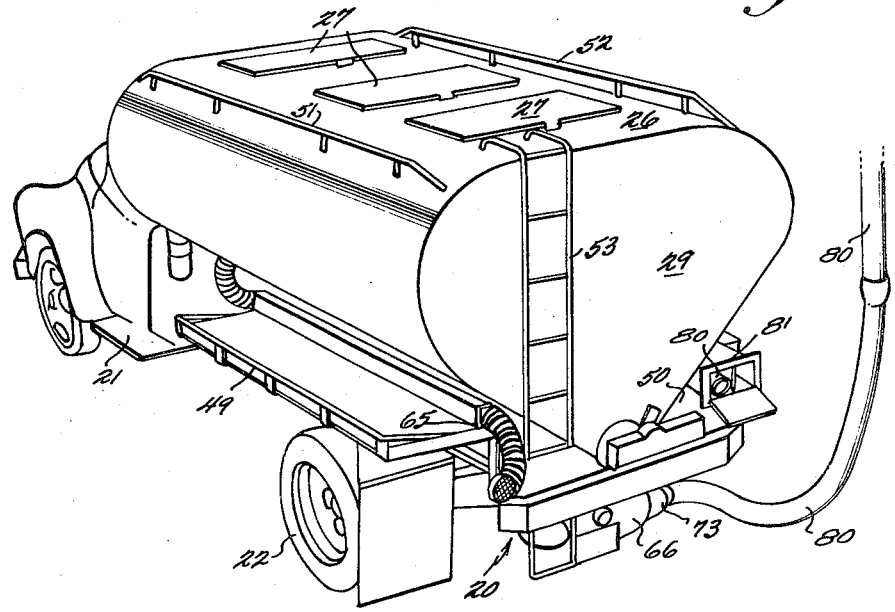
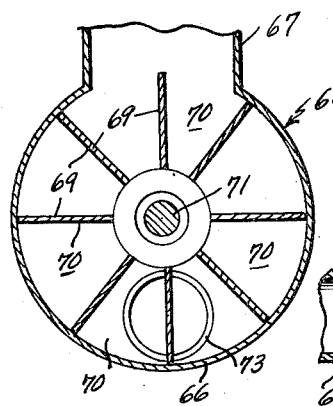
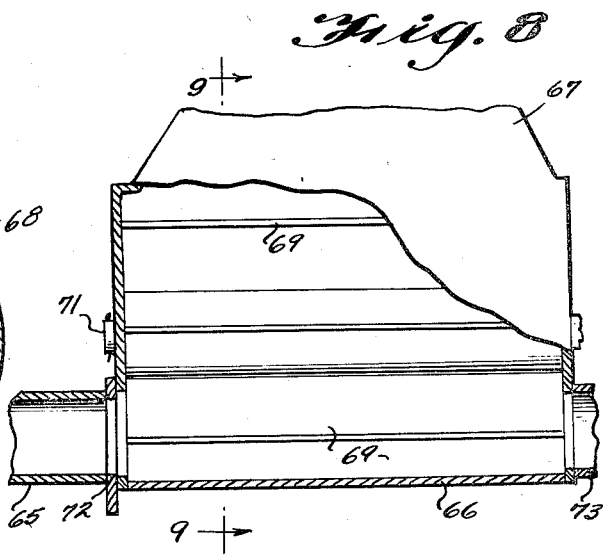
INVENTOR
GEORGE O. HOFFSTETTER
BY Kimmel & Crowell
ATTORNEYS

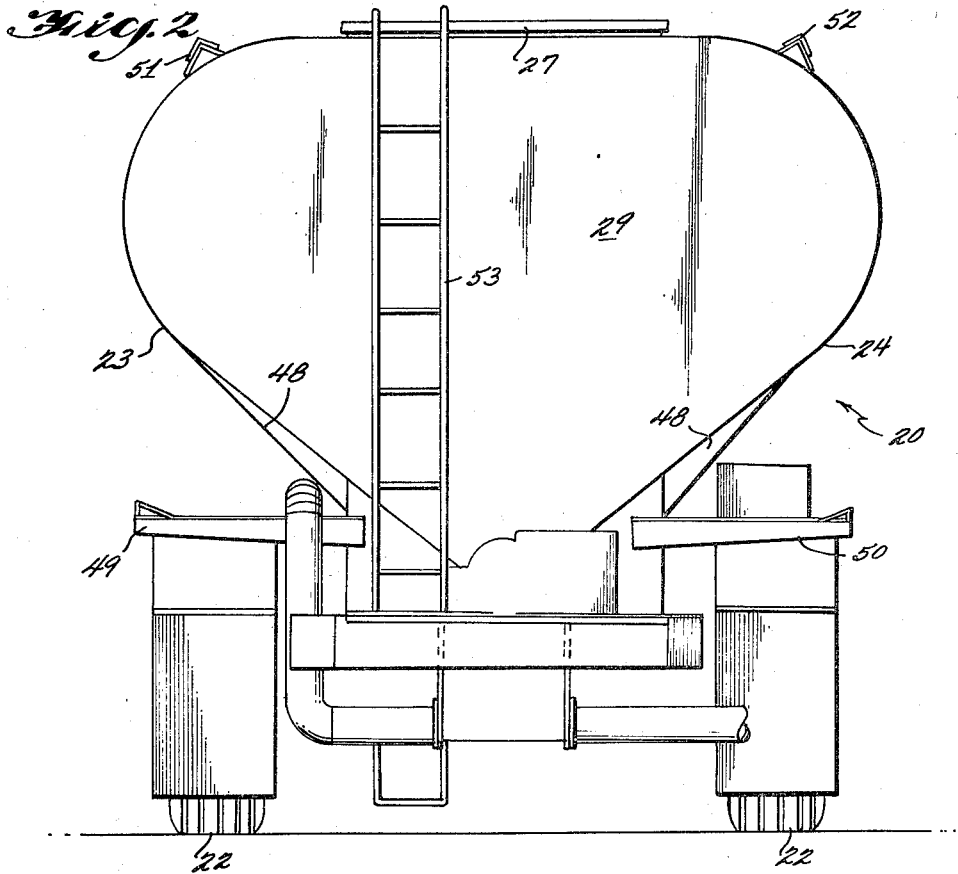
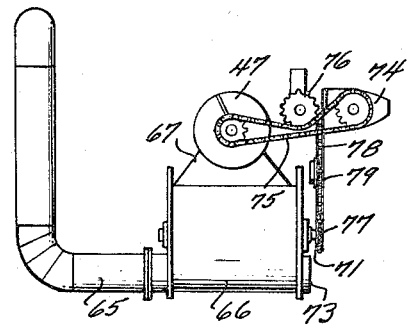

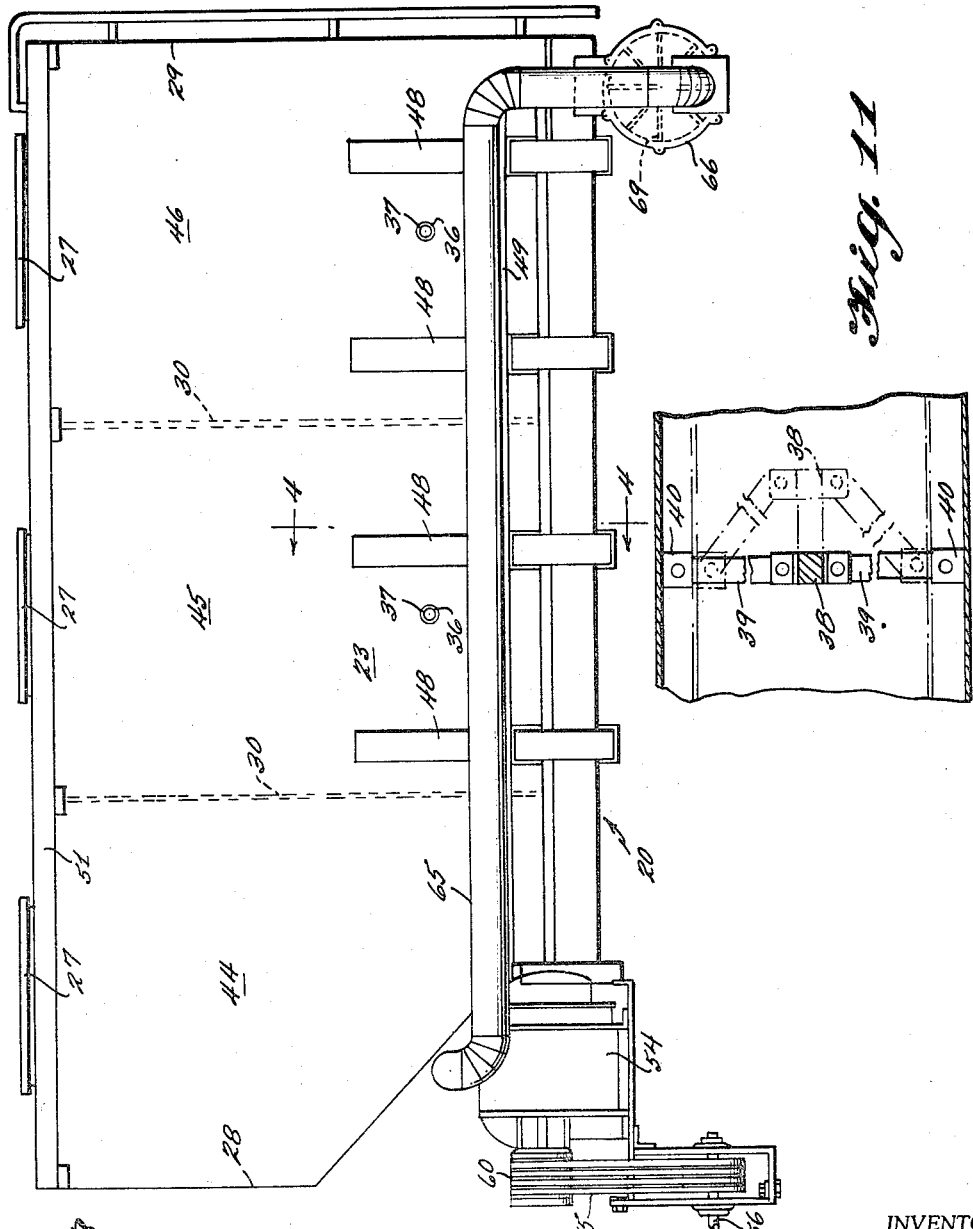

June 7, 1960   G. O. HOFFSTETTER   2,939,592
BULK FEED BODY
Filed Aug. 25, 1958   5 Sheets-Sheet 4

INVENTOR
GEORGE O. HOFFSTETTER
BY Kimmel & Crowell
ATTORNEYS

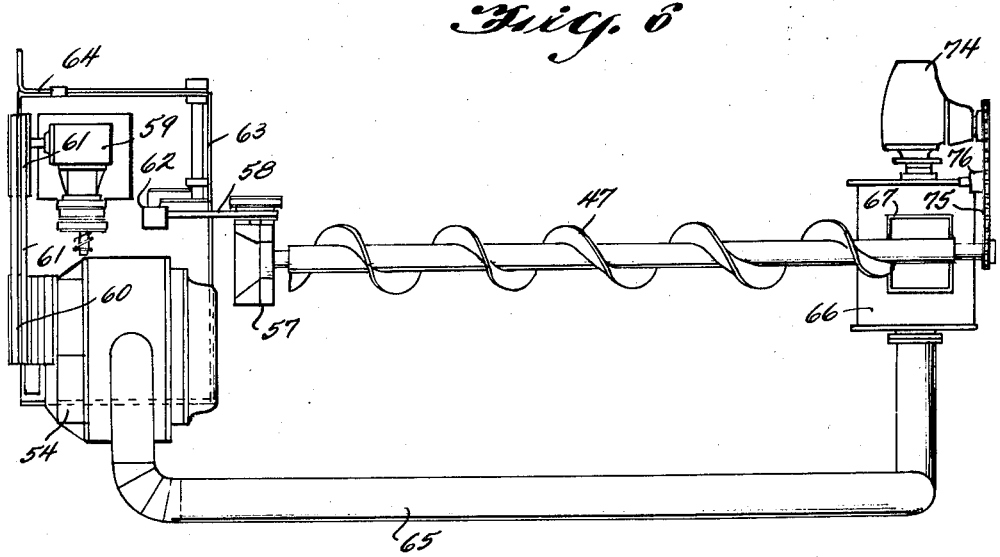
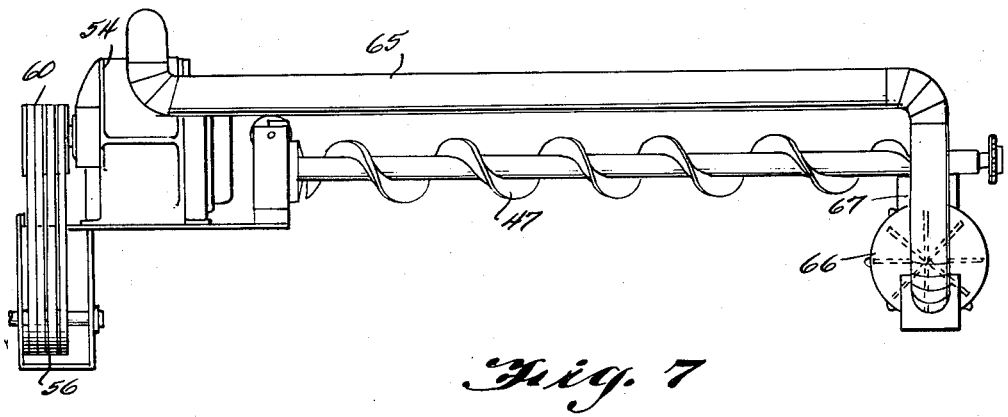

United States Patent Office 2,939,592
Patented June 7, 1960

2,939,592

BULK FEED BODY

George O. Hoffstetter, Baughman Mfg. Co. Inc., Shipman Road, Jerseyville, Ill.

Filed Aug. 25, 1958, Ser. No. 756,887

2 Claims. (Cl. 214—83.2)

The present invention relates to bulk feed bodies, and particularly to bulk feed bodies having a pneumatic delivery for loose dry material.

The primary object of the invention is to provide a bulk feed body having closed compartments for carrying dry loose material, and pneumatic means for delivering the material from the body.

Another object of the invention is to provide a bulk feed body of the class described above having means therein for controlling the flow of bulk material to the pneumatic conveyor.

A further object of the invention is to provide in a structure of the class described above an air lock between the pneumatic conveyor and the bulk feed body to eliminate passage of the conveying air from the conveyor to the bulk feed body.

A still further object of the invention is to provide in a bulk feed body of the class described above a screw conveyor for conveying the bulk material longitudinally to a pneumatic conveyor positioned at one end thereof.

Another object of the invention is to provide a bulk feed body of the class described above which is inexpensive to manufacture, simple to use, and which effectively delivers the bulk material therein to a remote position.

Other objects and advantages will become apparent in the following specification when considered in the light of the attached drawings, in which:

Figure 1 is a perspective view of the invention.

Figure 2 is a fragmentary rear elevation of the invention.

Figure 3 is a fragmentary side elevation of the invention.

Figure 6 is a top plan view of the conveyor structure removed from the truck.

Figure 7 is a side elevation of the conveyor structure removed from the truck.

Figure 8 is an enlarged fragmentary detail sectional view of the air lock.

Figure 9 is a fragmentary sectional view taken along the line 9—9 of Figure 8, looking in the direction of the arrows.

Figure 10 is an end elevation of the conveyor mechanism shown removed from the truck.

Figure 11 is a fragmentary horizontal section taken along the line 11—11 of Figure 5, looking in the direction of the arrows.

Figure 4:
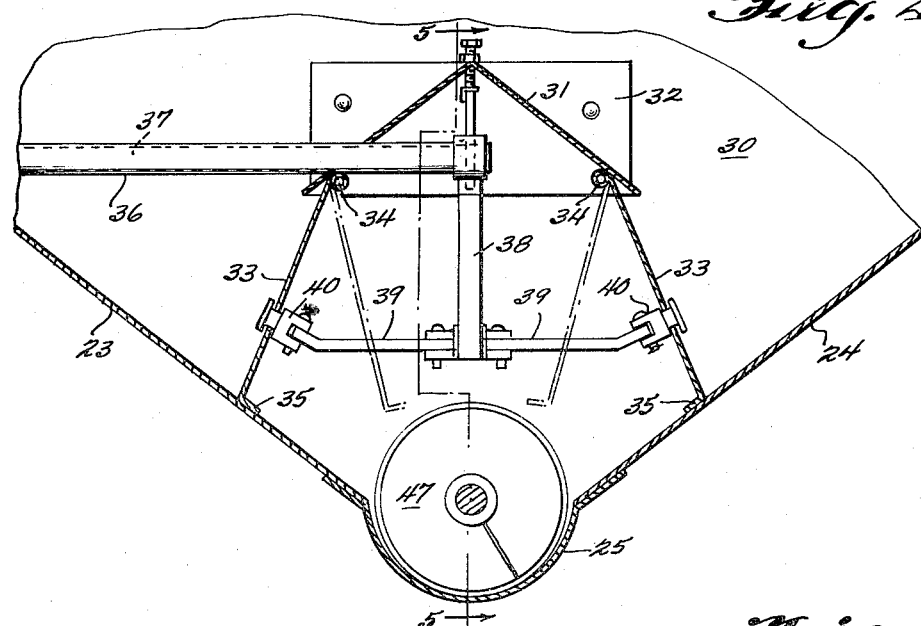
Figure 4 is an enlarged fragmentary transverse cross-section taken along the line 4—4 of Figure 3, looking in the direction of the arrows.
Figure 5:
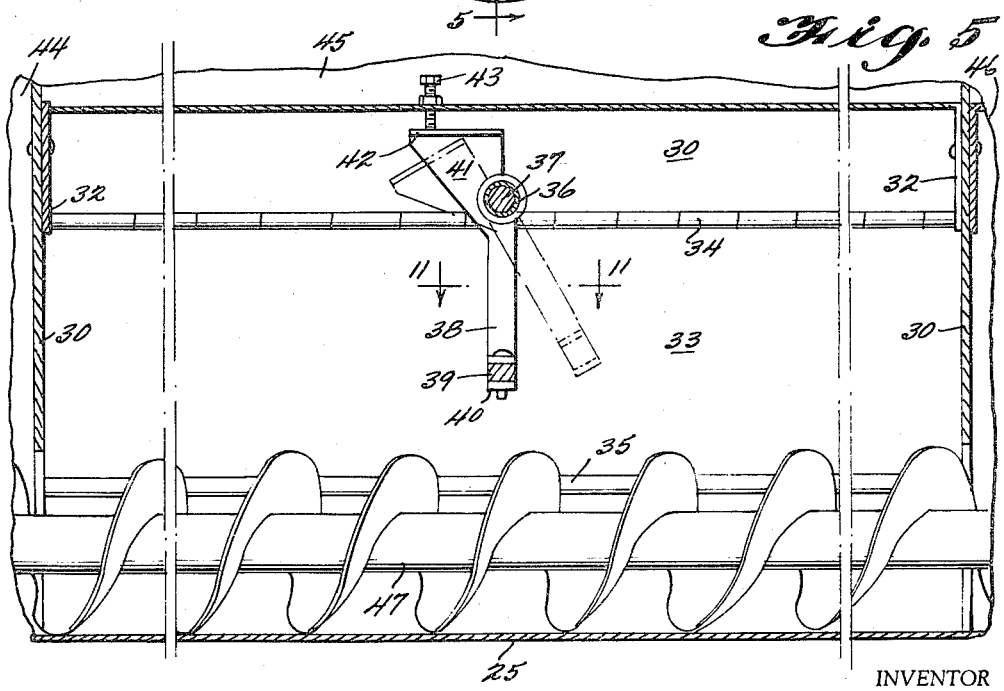
Figure 5 is an enlarged fragmentary longitudinal cross-section taken along the line 5—5 of Figure 4, looking in the direction of the arrows.

Referring now to the drawings in detail wherein like reference characters indicate like parts throughout the several figures, the reference numeral 20 indicates generally a bulk feed truck body constructed in accordance with the invention.

The bulk feed truck body 20 is mounted on a truck 21 of conventional design including rear driving wheels 22. The truck body 20 includes a pair of downwardly converging side walls 23, 24 connected at their lower ends by an arcuate bottom wall 25, as shown in Figure 4.

A top wall 26 extends between and connects the upper ends of the side walls 23, 24 and is provided with a plurality of spaced apart closures 27. A forward wall 28 is arranged at one end of the body 20 and a rear wall 29 is positioned at the opposite end thereof. A pair of bulkheads 30 extend transversely of the body 20 and divide the truck body 20 into three compartments each of which is provided with a separate closure 27 in the top wall 26. Additional compartments may be provided when desired.

An inverted V-shaped spreader plate 31 extends horizontally, spaced above the bottom wall 25 and is mounted to the bulkheads 30 by rectangular end plates 32. A feed control plate 33 is secured to each side of the V-shaped plate 31 by a longitudinally extending hinge 34. The control plates 33 are each provided with a flange 35 on the lower ends thereof which are arranged to engage the side walls 23, 24, respectively, with the control plates 33 in their outermost position.

A tubular housing 36 extends through each of the V-shaped plates 31 and through the side wall 23 intermediate the bulkheads 30. A control shaft 37 is journalled in the tubular housing 36 and terminates intermediate the opposite sides of the inverted V-shaped plate 31. A lever 38 is fixedly secured to the shaft 37 at its inner end and extends downwardly therefrom.

A pair of links 39 are pivotally secured to opposite sides of the lever 38 and extend outwardly therefrom toward the control plates 33. The links 39 are pivotally secured to the control plates 33 by fittings 40 so that longitudinally swinging movement of the lever 38 will draw the links 39 inwardly to swing the control plates 33 toward each other and away from the converging side walls 23, 24, as shown in dotted lines in Figure 4.

A plate 41 is rigidly secured to the lever 38 and is provided with an angle iron flange 42 fixedly secured to the upper edge thereof. A vertically adjustable set screw 43 projects through the apex of the inverted V-shaped plate 31 and is positioned to engage the flange 42 limiting the swinging movement of the lever 38 in one direction.

The lever 38 is adapted to swing slightly past dead center before engaging the set screw 43 so as to lock the control plates 33 in their outward closed position. The shaft 37 is adapted to have a hand control lever (not shown) secured to its outer end to permit the lever 38 to be swung so as to open the control plates 33 to permit the passage of bulk feed thereunder.

The bulkheads 30 divide the body 20 into a forward hopper compartment 44, a central hopper compartment 45, and a rear hopper compartment 46. The forward compartment 44 is not provided with a spreader plate 31 and feed control plates 33, these being used only in compartments 45 and 46.

An elongated conveyor screw 47 extends longitudinally of the body 20 supported in the arcuate bottom wall 25, as best shown in Figure 4.

The body 20 is supported on a plurality of jacks 48. A catwalk 49 is supported on the jacks 48 on one side of the truck 21 and extends outwardly from the body 20 in a generally horizontal plane overlying one of the rear wheels 22. A second catwalk 50 is supported on the opposite side of the body 20 on the jacks 48 and extends outwardly therefrom in a generally horizontal plane overlying the other rear wheel 22.

Longitudinally extending safety rails 51, 52 are positioned on opposite sides of the top wall 26 of the body 20 to assist in climbing onto the top wall 26 to open the closures 27. A ladder 53 has its top edge secured to the top wall 26 and extends downwardly therefrom in rearwardly spaced relation to the rear wall 29.

A blower 54 is mounted on the truck 21 at the forward end of the body 20 and is driven through belts 55 from a power take off 56 of the truck 21. A right angle drive gear case 57 is secured to the forward end of the screw 47 and is driven by a V-belt 58 extending from a transmission 59. The transmission 59 is driven from the blower pulley 60 by means of V-belts 61.

An idler roller 62 is journalled on an eccentric arm 63 and engages the belt 58 to tighten the belt 58 causing the transmission 59 to drive the right angle drive gear case 57. A lever latch 64 engages the eccentric arm 63 for securing the idler roller 62 out of engagement with the V-belt 58.

A conduit 65 is connected to the outlet side of the blower 54 and extends rearwardly therefrom supported on the catwalk 49. A rotary feeder drum 66 is supported beneath the rear end of the body 20 and is provided with a conduit 67 extending upwardly therefrom communicating with the arcuate bottom wall 25 adjacent the rear end thereof.

A valve, generally indicated at 68, is provided with a plurality of radially extending circumferentially equispaced vanes 69 positioned within the drum 66 and forming therewith a plurality of chambers 70. A shaft 71 has its opposite ends journalled in the drum 66 and supports the vanes 69 for rotation in the drum 66.

The conduit 65 communicates with the drum 66 at 72, and a second conduit 73 communicates with the drum 66 in opposed relation to the conduit 65. The conduit 65 and the conduit 73 are arranged in aligned relation with their axes parallel to the axis of the shaft 71.

A bevel gear case 74 is supported on the under side of the rear of the body 20 and is driven from the rear end of the conveyor screw 47 by a chain 75. An idler sprocket 76 engages the chain 75 to maintain it in driving relation with respect to the screw 47 and the gear case 74. A sprocket 77 is mounted on the shaft 71 and a chain 78 connects the sprocket 77 with gear case 74. An idler sprocket 79 maintains the chain 78 in driving relation to the sprocket 77 and the gear case 74 so that upon rotary movement of the conveyor screw 47, the shaft 71 and vanes 69 are rotated within the drum 66.

In the use and operation of the invention, dry bulk material in the compartment 44 is fed along the conveyor screw 47 and dropped through the conduit 67 into the drum 66. Rotation of the shaft 71 rotates the vanes 69 and chambers 70 so as to sucessively align the chambers 70 with the conduits 65, 73. Air from the blower 54 flowing through the conduit 65 flows through the chambers 70 aligned with the conduit 65, 73 and pneumatically conveys dry bulk material out of the drum 66 into the conduit 73 to a remote point of discharge.

The vanes 69 engage the walls of the drum 66 sufficiently tight to prevent air from flowing upwardly through the conduit 67 into the body 20.

Upon emptying the compartment 44, the feed control plates 33 in the compartment 45 are released by rotating the shaft 37 to permit the feed control plates 33 to swing inwardly allowing the dry bulk material in the compartment 45 to reach the conveyor screw 47. Upon emptying the compartment 45, the compartment 46 is emptied in a similar manner.

The conduit 73 is formed of a plurality of sections 80 which are stored in a chest 81 mounted on the catwalk 50 of the truck 21.

Having thus described the preferred embodiments of the invention, it should be understood that numerous structural modifications and adaptations may be resorted to without departing from the scope of the appended claims.

What is claimed is:

1. A bulk feed body comprising a transportable frame, a hopper having downwardly converging side walls and an arcuate bottom wall mounted on said frame, a helical conveyor extending longitudinally of said hopper on said bottom wall, a blower mounted on said frame exteriorly of said hopper, adjacent one end thereof, a feeder drum mounted adjacent the bottom of said hopper at its other end, a communication between said hopper and said feeder drum adjacent the end of said bottom wall and depending therefrom, a conduit connecting said blower and said feeder drum, power means carried by said frame, a driving connection between said power means and said blower, a second driving connection between said first driving connection and said helical conveyor at the end thereof adjacent said blower, a gear case adjacent said feeder drum, means operatively connected to the other end of said helical conveyor for driving the mechanism of said gear case, a plurality of rotatably mounted vanes in said feeder drum, forming a seal between said hopper and said conduit from said blower, means drivingly connecting said rotatable vanes with said gear case, and an outlet from said drum, control means in said hopper for controlling the gravity flow of material therein to said screw conveyor, said control means comprising an inverted V-shaped spreader plate in said hopper, feed control plates hingedly secured to each side of said spreader plates, a tubular housing extending through said V-shaped plates and exteriorly of said hopper, and a control shaft extending through said tubular housing and connected to said control plates.

2. The structure of claim 1 wherein the connection between said control shaft and said control plates comprises a lever secured to said control shaft and a pair of links pivotally secured between the end of said lever and a control plate, and stop means engageable by said lever for limiting the movement of said lever and hence the movement of said control plates.

References Cited in the file of this patent

UNITED STATES PATENTS

| | | |
|---|---|---|
| 2,030,553 | Tiley | Feb. 11, 1936 |
| 2,412,121 | Bradshaw | Dec. 3, 1946 |
| 2,522,077 | Wahl et al. | Sept. 12, 1950 |
| 2,575,639 | Scranton et al. | Nov. 20, 1951 |
| 2,601,608 | Hansen | June 24, 1952 |
| 2,614,708 | Hoffstetter | Oct. 21, 1952 |
| 2,694,496 | Atkinson | Nov. 16, 1954 |
| 2,798,628 | Fisher | July 9, 1957 |
| 2,865,521 | Fisher et al. | Dec. 23, 1958 |